Nov. 22, 1960     B. W. OSWALT     2,961,074
BRAKE MECHANISM

Filed Oct. 28, 1957     4 Sheets-Sheet 1

INVENTOR.
B. W. OSWALT
ATTY

INVENTOR.
B. W. OSWALT

Nov. 22, 1960   B. W. OSWALT   2,961,074
BRAKE MECHANISM
Filed Oct. 28, 1957   4 Sheets-Sheet 3

INVENTOR.
B. W. OSWALT
BY
*J W Haney*
atty

INVENTOR.
B. W. OSWALT

United States Patent Office 2,961,074
Patented Nov. 22, 1960

2,961,074

BRAKE MECHANISM

Burlin W. Oswalt, Union, Ohio, assignor to The B. F. Goodrich Company, New York, N.Y., a corporation of New York Filed Oct. 28, 1957, Ser. No. 692,690

8 Claims. (Cl. 188—78)

This invention relates generally to hydraulic brakes and more particularly to improved actuating mechanism for brakes and the like which mechanism is automatically adjustable to compensate for wear to thereby maintain uniform release clearance between the engageable braking members. The invention is especially useful for aircraft brakes and brakes for similar high energy service.

According to this invention a brake structure is provided embodying hydraulic actuating mechanism for engaging and releasing the brake in a manner such that a uniform braking action is obtained each time the brake is engaged, and dragging or locking of the brake is effectively prevented. The actuating mechanism incorporates into a single compact unit an actuating piston, piston-retracting means, and means for automatically adjusting the starting position of the actuating piston to maintain a uniform release clearance between the engageable braking members. The adjusting means functions entirely in response to changes in pressure and to displacement of hydraulic liquid contained within the mechanism and is positive, accurate and sensitive under all operating conditions.

A brake equipped with this actuating mechanism is effectively prevented from dragging or locking because the actuating mechanism is adapted to compensate for the so-called "transitory" slack in the brake system as well as compensating for permanent slack resulting from wear. Transitory slack in a brake system is apparent slack between the engageable brake members resulting from resilient deflection of the braking members and/or thermal distortion and warpage of these members when the brakes are applied. To compensate for the effects of both wear and transitory slack, the adjusting means component of the actuating mechanism operates hydraulically to regulate the retraction stroke of the actuating piston so that the starting position of this piston may be automatically adjusted either forwardly in the direction in which the piston exerts its braking force, or in the reverse direction as the particular operating conditions may require.

Actuating mechanism in accordance with this invention is unusually small and compact so that the mechanism may be incorporated wholly within the brake frame. Accordingly a brake structure equipped with such mechanism need have no exposed retractor springs or the like and the assembly of the brake structure is greatly simplified. The mechanism is equally suitable for brakes in which the braking force is exerted transversely to the rotational axis of the rotating brake member (e.g. drum brakes) or for brakes in which the braking force is exerted parallel to the rotational axis (e.g. disc-type brakes). One or several individual actuating mechanisms may be used to operate a particular brake structure and where several individual mechanisms are used, each operates independently from the others and is capable of independent replacement.

The invention will be more fully described with reference to the accompanying drawings which illustrate brake structures incorporating preferred forms of actuating mechanisms embodying this invention.

Figure 1:
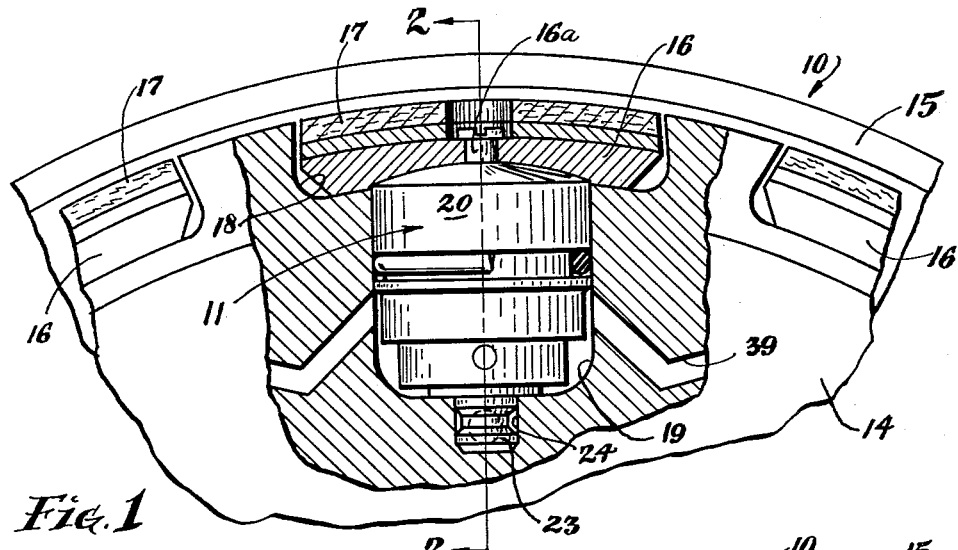
Fig. 1 is a fragmentary side elevational view of a drum brake structure incorporating actuating mechanism embodying this invention, the brake being shown in disengaged condition.
Figure 2:
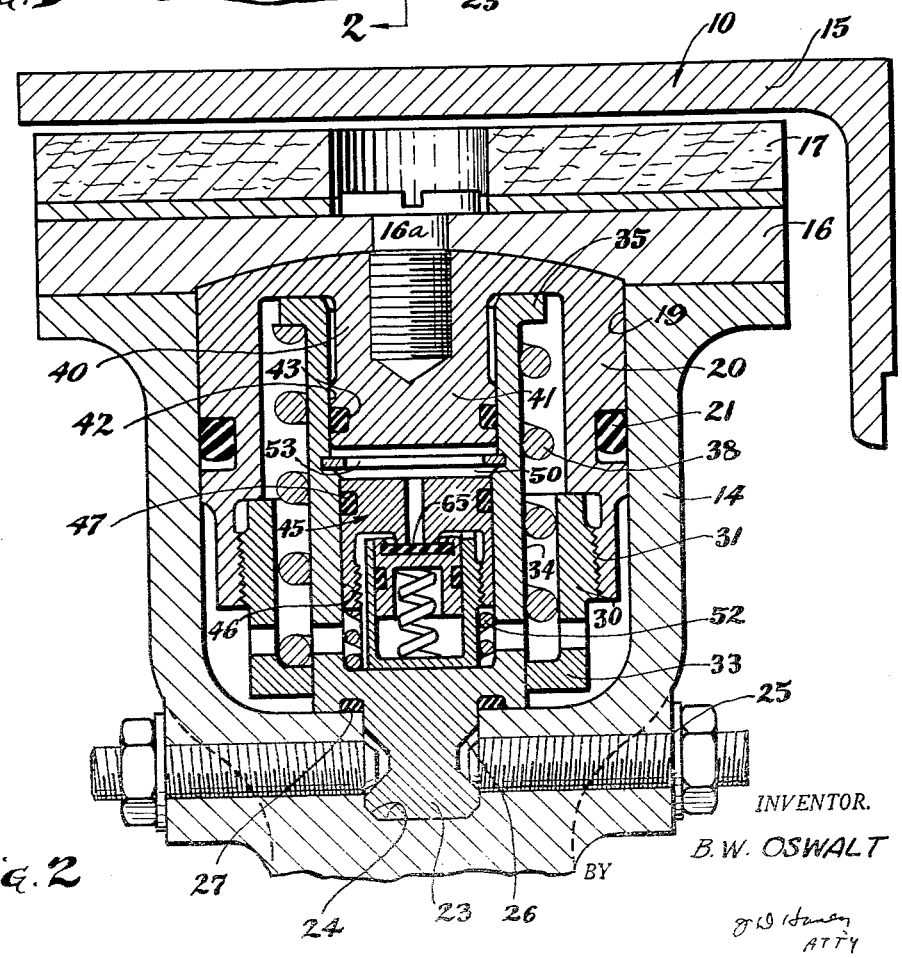
Fig. 2 is a view taken on the line 2—2 of Fig. 1 and drawn to an enlarged scale, the view showing an axial cross section of the actuating mechanism of Fig. 1 when the brake is disengaged.
Figure 3:
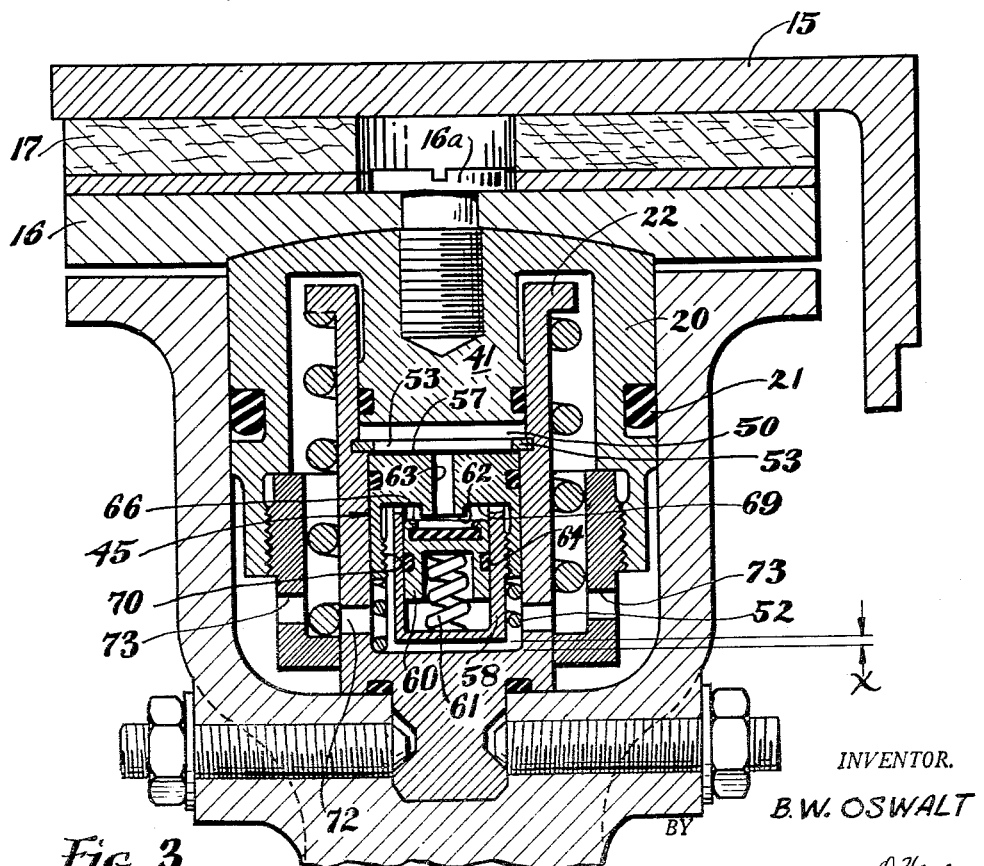
Fig. 3 is a sectional view like Fig. 2 but showing the parts of the actuating mechanism when the brake is fully engaged.

Figs. 1–3 show the structural details of a drum brake 10 and preferred actuating mechanism 11 therefor. The brake 10 includes an annular non-rotatable brake frame 14 concentrically surrounded by an annular brake drum 15 rotatable with a wheel (not shown) with which the brake is associated. A series of arcuate brake blocks 16 each having a friction lining 17 are carried on the brake frame 14 in axial channels 18 opening into the periphery of the brake frame. The brake blocks 16 are connected by fasteners 16a to their respective actuating mechanisms 11 identical with the one shown in detail in Figs. 2–3. To engage the brake, each brake block 16 is adapted to be urged radially outward against the brake drum by its respective actuating mechanism 11. When the brake is disengaged, as in Figs. 1 and 2, the brake blocks 16 are retracted in their respective channels 18 with the outer face of the linings 17 flush with the periphery of the brake frame. The lateral sides of each channel 18 are parallel to the radial displacement axis of the block seated therein so that each block is supported against endwise movement as it is urged toward the drum.

The actuating mechanisms 11 for the respective brake blocks 16 are housed in cylinders 19 bored radially into the brake frame at the bottom of the several channels 18. Each actuating mechanism 11 includes a cup-shaped actuating piston 20 (Fig. 2) which fits snugly against the walls of its respective cylinder 19 and is sealed in slidable engagement with the cylinder wall by an O-ring 21.

The actuating piston 20 is reciprocable in cylinder 19 relative to a stationary tubular central housing 22 which is fastened to the bottom of the cylinder by means of an end knob 23. The knob 23 projects into a socket 24 formed in the brake frame at the bottom of cylinder and is secured in the socket by a pair of opposing studs 25 threaded laterally through the brake frame into an annular tapered groove 26 in the knob. The studs anchor the actuating mechanism 11 securely in the cylinder 19 but permit the housing 22 to wobble slightly to minimize possible binding of the actuating piston against the cylinder if the cylinder becomes slightly enlarged and out-of-round during service. An O-ring seal 27 surrounds the knob 23 in a groove at the junction of the knob and inner housing and bears against the bottom of cylinder to prevent leakage of actuating liquid into socket 24.

The actuating piston 20 concentrically surrounds the housing 22 and is telescopically engaged with the housing by a barrel 30 which is fastened in the open end of piston 20 by threads 31. The barrel terminates in an annular inwardly directed flange 33 which slidably embraces the external cylindrical surface 34 of the housing. Flange 33 of the barrel is parallel to an overlapping annular outwardly directed flange 35 at the outer end housing 22. The actuating piston 20 together with the barrel 30 are biased toward the bottom of cylinder 19 by a retractor spring 38 which axially surrounds the inner housing and which is held under compression between the flanges 33 and 35.

The actuating piston 20 further includes a central axial plunger 40 which projects into the outer open end of central housing 22 and terminates in a piston portion 41 which is slidable in a bore 42 on the interior surface of the housing and 22 which is sealed against this bore by an O-ring 43. The plunger extends through about half the axial length of the housing 22 and is directed toward a floating piston 45 which is housed for reciprocation in in a bore 46 in the radially inner portion of the central housing 22. The floating piston 45 is maintained in sealed sliding engagement with the bore 46 by an O-ring 47 so that inside the central housing 22 between the opposing piston portion 41 and the floating piston 45 there is defined a sealed chamber 50 which is filled with hydraulic actuating fluid. The isolated volume of fluid contained within this chamber 50 is hereinafter called the "fluid link" of the mechanism.

The floating piston 45 is biased against this fluid link by a spring 52 within the bottom of housing 22 and the piston portion 41 is urged against the opposite side of the fluid link by the retractor spring 38. When the actuating piston 20 is moved forward to engage the brake, spring 52 and also the fluid in cylinder 19 moves the floating piston 45 forward also so that the fluid link is displaced forwardly in housing 22 with the actuating piston. The forward travel of the floating piston 45 under these conditions is limited by an annular snap ring 53 embedded inside central housing 22 between plunger 40 and the floating piston 45 at the junction of their respective bores 42 and 46. On each actuation of the mechanism, the floating piston 45 moves from the bottom of housing 22 as in Fig. 2 to an extended position engaging snap ring 53 as in Fig. 2; and when pressure is released, the piston 45 is retracted against spring 52 to the bottom of housing 22.

The floating piston 45 has a front face 57 (see Fig. 3) acting against the fluid link and the opposite end of piston 45 is threaded onto a tubular cap 58 which is surrounded externally by the floating piston spring 52. The interior of cap 58 is bored to slidably receive a pressure-sensing valve 60 which is urged by a valve spring 61 contained within cap 58 toward a seated position against an annular seat 62 around the inner end of a port 63 through piston 45 and leading into the fluid link in chamber 50. The pressure-sensing valve 60 is sealed against the internal bore of cap 58 by an O-ring 64 to prevent leakage of actuating fluid into the region of cap 58 behind valve 60. This latter region is empty of fluid at all times so that the pressure-sensing valve 60 may be opened against the resistance of spring 61 without encountering impedance of liquid in this region. To insure an adequate seal against the seat 63 when valve 60 is closed, the front face of valve 60 is covered with an annular rubber sealing disc 65. The front face of pressure-sensing valve 60 is of greater diameter than the annular seat 62 and the annular peripheral margin 66 which extends beyond seat 62 serves as a hydraulic actuating surface to open valve 60.

The peripheral margin 66 of valve 60 is exposed to hydraulic actuating fluid in an annular channel 69 surrounding seat 62 in the interior surface of the piston 45 adjacent the mouth of cap 58. Channel 69 communicates with the interior of housing 22 behind the floating piston 45 through a port 70 through the threaded connection between cap 58 and piston 45. The interior of housing 22, in turn, is supplied with hydraulic actuating fluid from the cylinder 19 through a port 72 in the housing and a port 73 in barrel 30. The actuating fluid to operate each actuating mechanism may be supplied to the brake frame through one or more connections (not shown) and communicated through ports 39 (see Fig. 1) in the brake frame from one cylinder 19 to another. The actuating fluid entirely fills the spaces behind the actuating piston 20 in cylinder 19 as well as the space surrounding the central housing 22 and the region inside the housing 22 behind the floating piston 45, so that the thrusting force exerted on the actuating piston by the hydraulic fluid in cylinder 19 is proportional to the entire cross sectional area of cylinder 19.

*Operation of mechanism of Figs. 1–3*

To engage the brake 10, the hydraulic actuating fluid inside cylinder 19 is suitably pressurized by a pressure generator such as a meter cylinder (not shown). In response to such pressure, actuating piston 20 is urged forwardly, sliding barrel 30 telescopically forward along central housing 22 to compress retractor spring 38 and press block 16 against drum 15. Inasmuch as the floating piston 45 is subjected to the forward biasing force of spring 52 and it is also exposed to the pressurized hydraulic actuating fluid in cylinder 19, piston 45 is also urged axially forward through the central housing 22 thereby maintaining pressure on and displacing the fluid link in chamber 50 ahead of its against the piston portion 41 of the plunger 40 of the actuating piston. Under usual operating conditions, the actuating piston 20 will be fully extended to press the brake shoe against the brake drum at substantially the same instant that the floating piston 45 engages the snap ring stop 53.

While the floating piston assembly 45 is moved outward toward the snap ring stop 53, the pressure-senssing valve 60 remains closed against seat 62 to keep port 63 shunt. However, as soon as the actuating piston 20 is extended sufficiently so that the brake block 16 is firmly pressed against the brake drum 15, the pressure of the hydraulic fluid inside the cylinder 19 builds up rapidly to the full line pressure of the hydraulic system and thus this pressure acts against the marginal surfaces 66 of the valve 60 through port 72 and groove 69 to force open valve 60 against its spring 61 as illustrated in Fig. 3. The pressure-sensing valve 60 is fully open as in Fig. 3 throughout a period in which the brake is fully engaged. There is usually no flow of fluid through port 63 when valve 60 is initially opened; however, because usually at this period in the operation, the pressure in the fluid link equals the pressure of the actuating fluid in cylinder 19 behind the piston 20.

If the brake is released before any significant lining wear or heating of the drum occurs, the pressure-sensing valve 60 immediately snaps closed against seat 62 as soon as the pressure of the actuating fluid is relieved. Simultaneously with the closing of valve 60, retractor spring 38 expands to retract the actuating piston 20 along housing 22 into the cylinder 19. As piston 20 retracts its plunger 40 piston 20 acts against the top of the fluid link to displace it against the floating piston 45, thereby returning the assembly to its release position in the bottom of the housing 22 as in Fig. 2. Under these conditions the volume of the fluid link remains unchanged and the actuating piston 20 together with the barrel 33 are retracted to the same positions relative to the inner housing which they previously occupied when the brake was actuated.

In high energy braking such as in aircraft brakes, there may be a substantial thickness of the brake lining 17 worn away during a period in which the brake is applied. Similarly, the braking forces are so substantial and because of the intense heat generated, the drum may tend to expand or bell out away from the brake blocks. Any of these effects tends momentarily to relieve the braking force of shoe 16 against drum 15, but since actuating piston 20 is directly exposed in cylinder 19 to the full line pressure of the hydraulic system, piston 20 will be stepped progressively forward toward the drum as any of these effects occur to maintain full braking pressure of the shoe 16 against the drum. As the actuating piston 20 is thus stepped forward, the plunger 40 of piston 20 is moved axially away from the fluid link and piston 45 to relieve pressure on the fluid link because piston 45 under these conditions is engaged with snap ring stop 53. However, since the pressure-sensing valve 60 is fully open under these circumstances, actuating fluid from cylinder 19 can immediately flow from the cylinder 19 through passage 70 and groove 69 and port 63 in response to a decrease in pressure in the fluid link to augment the volume of the fluid link and restore the pressure of the fluid link to the line pressure of the hydraulic system. Fluid is thus progressively introduced into the fluid link directly proportional to the distance actuating piston 20 is stepped forward to take up wear and maintain braking contact between the shoe and drum.

Thereafter when the line pressure on the actuating fluid in cylinder 19 is relieved to release the brake, the pressure-sensing valve 60 instantly snaps shut and traps the added volume of fluid in the fluid link. Accordingly, because of the now greater volume of the fluid link against which plunger 40 acts to retract piston assembly 45, the actuating piston 20 is prevented from returning to its original starting position relative to housing 22. Instead piston 20 is retracted to a new starting piston on housing 22 in which new position there will be the desired uniform release clearance between the shoe and the drum.

The retraction stroke of piston 20 is synchronous with the retraction stroke of floating piston 45, and since piston 45 is always retracted a uniform distance (dimension X in Fig. 3), the actuating piston 20 will therefore also be retracted a uniform distance from its location when the brake is released. The desired "release clearance" between brake shoes 16 and the drum is therefore proportional to the distance the floating piston 45 may be displaced axially (dimension X). The designer may select the location of the snap ring stop 53 to provide the particular release clearance desired for the brake.

It will be evident from the foregoing explanation that during successive applications of the brake in which lining wear or drum expansion occurs, the starting position of the actuating piston 20 will be stepped progressively forward on central housing 22 toward the drum as a result of the progressive increase in the volume of the fluid link to thereby maintain a uniform release clearance. Consequently the pedal action of the brake system will remain uniform.

Following a braking application in which the brake drum undergoes substantial thermal expansion or resilient deflection, the subsequent shrinkage of the brake drum to its normal dimensions may radically reduce the desired release clearance, or, indeed may even cause the drum to exert intense constricting force on the brake shoe. Under these circumstances, the brake is said to be in "over-adjusted" condition because there is more fluid in the fluid link than is needed to compensate for wear.

With the mechanism of this invention, the brake cannot become locked as a result of an "over-adjustment," even though the brake drum 15 actually shrinks tightly against the brake shoes because such a constricting force results in an increase in the pressure of the fluid link through plunger 40 of piston 20. Since the fluid link acts directly against the front face of pressure-sensing valve 60 through port 63, a substantial pressure rise in the fluid link eventually forces open valve 60 to relieve this pressure by allowing some of the link fluid to bleed backward through port 63 and passage 72 into the regions of cylinder 19 behind piston 20. In this manner the volume of the fluid link is reduced to permit the actuating piston 20 to move backwardly from the brake drum until the brake shoe is in light dragging engagement with the drum. Valve 60 will snap closed again whenever the pressure in the fluid link drops below the particular valve necessary to overcome spring 61.

It should be noted that the pressure-sensing valve 60 can open either in response to a predetermined pressure in the fluid link acting through port 63, or in response to a predetermined pressure of fluid in channel 69 acting against the marginal actuating surface 66 of valve 60.

Whenever the mechanism is in over-adjusted condition, the desired release clearance may be restored automatically by merely depressing the brake pedal momentarily after the brake drum has returned to its normal size and shape. The mechanism 11 then operates automatically to reset the location of piston 20 by further decreasing the volume of the fluid link. A depression of the brake pedal to pressurize the brake system when the mechanism is "over-adjusted" displaces the actuating piston 20 to urge the shoes against the drum in the manner previously explained. But since the release clearance of the brake shoes is now less than the amount desired, the brake shoe will reach its engaged position on the drum appreciably before the floating piston 45 is moved all the way to snap ring stop 53. As soon as the shoe 16 is pressed firmly against the drum 15 by the actuating piston 20, however, the pressure of the hydraulic actuating fluid inside cylinder 19 immediately rises to full line pressure and forces open the pressure-sensing valve 60, regardless of the axial location of the piston 45. Then, even though the pressure in the fluid link now equals the pressure of the actuating fluid in cylinder 19 so that the fluid pressure on the opposing sides of the floating piston 45 is equalized, the spring 52 acts against the floating piston 45 to move it axially forward against the fluid link so that some of the fluid link spills backwardly through port 63 and open valve 60. Piston 45 is moved forwardly in this manner until it engages snap ring stop 53. Then when the pressure of the actuating fluid is released, the pressure-sensing valve 60 instantly snaps shut trapping the remaining volume of fluid in the fluid link. Thereafter the actuation piston 20 is retracted to a position on housing 22 corresponding to the new volume of fluid in the fluid link, by the operation of the retractor spring 38 as in the previous mode of operation. The new position of the actuating piston 35 is such that the desired release clearance for which the mechanism is designed is restored.

In a drum type brake such as brake 10, over-adjustment occurs primarily because of thermal expansion of the brake drum rather than by resilient deflection as is usually the case with disc-type brakes. A somewhat longer period is usually required for the drum to cool down and resume its normal size following an expansion than for a disc brake. However, whenever the drum shrinks to its normal size, the desired uniform release clearance can be reset by merely depressing the brake pedal.

The actuating mechanism 11 is designed so that if there is any mechanical failure of the floating piston assembly 45 or if the pressure-sensing valve 60 binds or otherwise fails to operate properly, the actuating piston 20 will still be operable to exert braking force. Under such circumstances the actuating piston 20 merely may not retract for the full release clearance.

The actuating mechanism 11 advantageously adjusts each brake shoe 16 individually to compensate for wear to which each shoe is subjected. Thus the release clearance throughout the periphery of the brake is accurately maintained.

Figure 4:
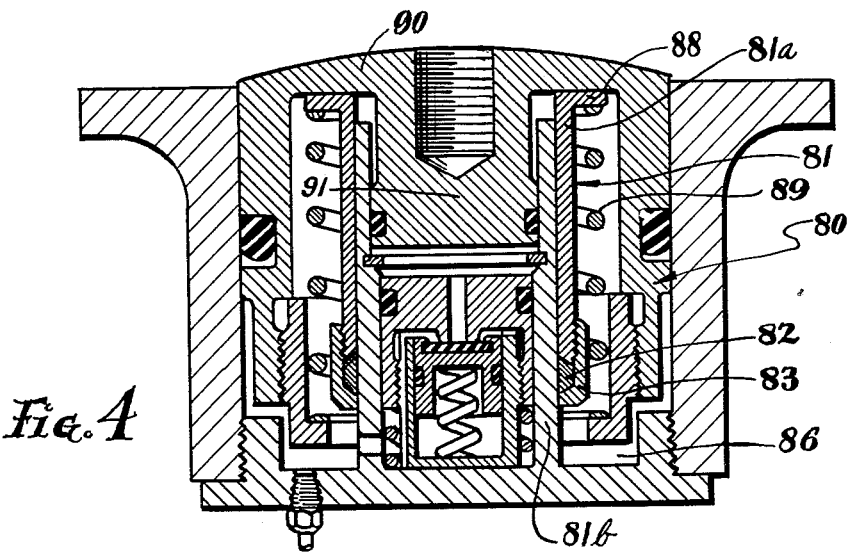
Fig. 4 is an axial cross sectional view of another actuating mechanism embodying this invention.

*The species of Fig. 4*

The adjuster mechanism 80 of Fig. 4 is similar in construction to the mechanism of Figs. 1–3 but differs principally in that mechanism 80 includes a central housing 81 made of two telescoping tubes 81a and 81b which are fastened together in frictional gripping engagement by a collet 82 and a collet nut 83 threaded onto tube 81a. The inner tube 81b is integral with an end-cap 85 which is threaded into the end of cylinder 86 in which mechanism 80 is received. The mechanism 80 is inserted into cylinder 86 from the end of the cylinder away from the brake shoes (not shown). The outer tube 81a fits snugly about inner tube 81b and terminates in an outwardly directly flange 88 which retains the upper end of the retractor spring 89. The collet nut 83 is tightened sufficiently so that the axial force required to displace the inner and outer tubes 81a and 81b axially relative each other is substantially greater than the force required to compress the retractor spring 89.

The mechanism 80 functions like that of Figs. 1–3 in operating a brake. However, whenever the actuating piston 90 of mechanism 80 reaches an extended position in which spring 89 is wholly collapsed but where additional forward movement is required for the piston 90, then the hydraulic fluid acting on the actuating piston 90 in cylinder 86 can overcome the frictional grip of collet 82 and cause the outer tube 81a to slide axially forward on the inner tube 81b thereby relieving compression on spring 89. Thus the central housing 81 is lengthened and its flange 88 repositioned to relocate the retractor spring 89 for a new range of adjustment for the actuating piston. With this construction the range of adjustment for the actuating piston is limited only by the axial length of its plunger 91 within the inner tube 81b of the housing. One advantage of this construction is that it greatly extends the range through which the starting position of the actuating piston 90 may be adjusted without adding materially to the overall weight or size of the mechanism.

Figure 5:
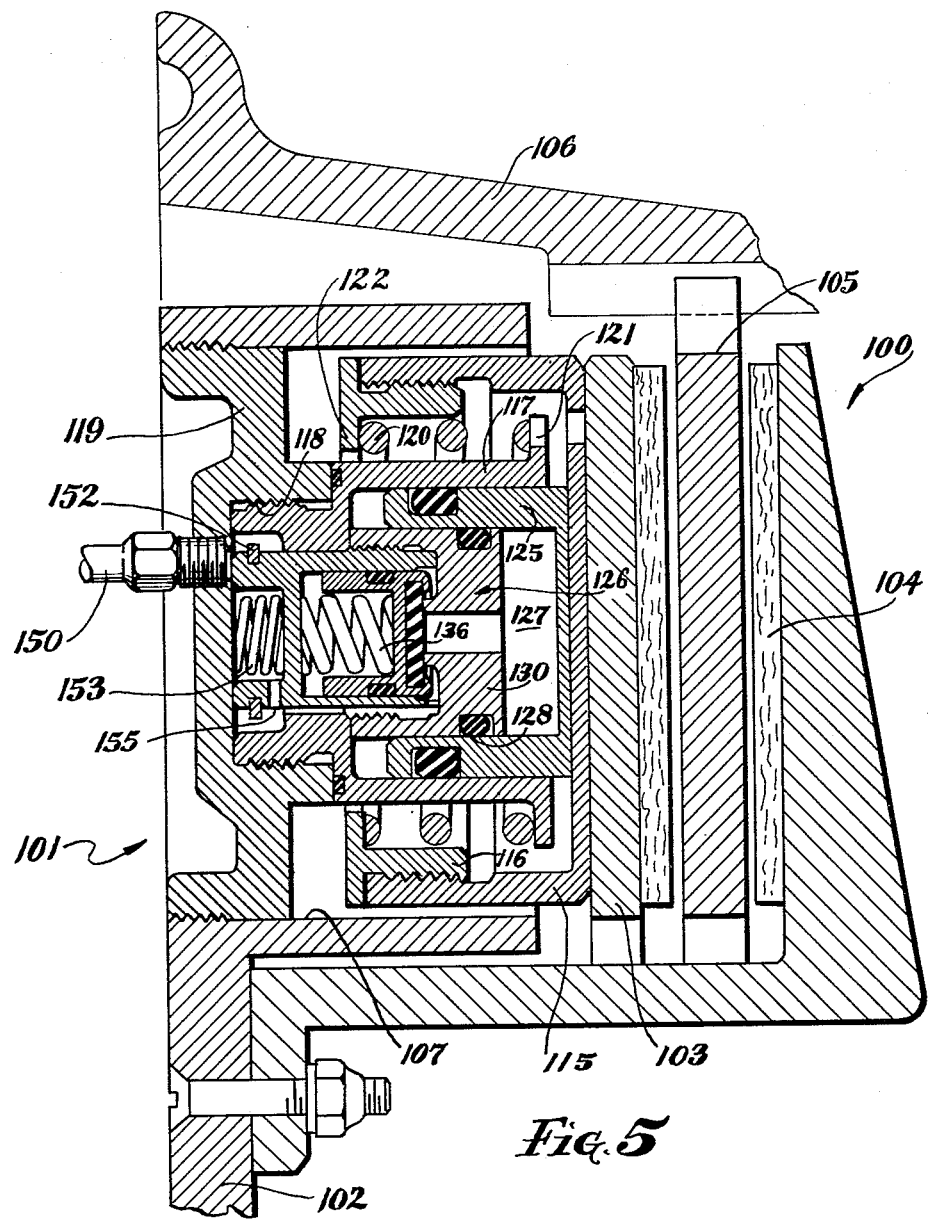
Fig. 5 is a radial fragmentary view of a disc-brake structure incorporating still another form of actuating mechanism embodying this invention, the view showing an axial cross section of the actuating mechanism when the brake is disengaged.
Figure 6:
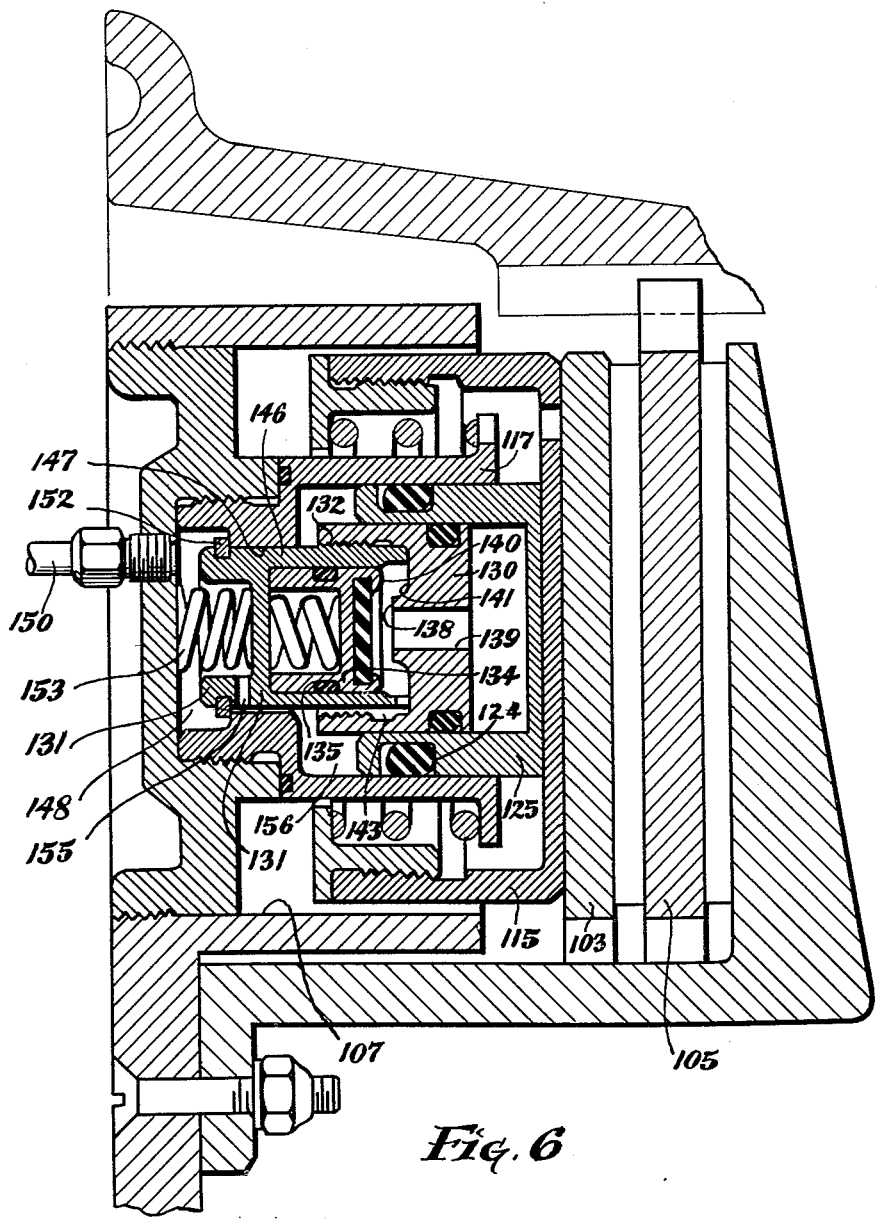
Fig. 6 is a view similar to Fig. 5 but showing the condition of the actuating mechanism when the brake is fully engaged.

The embodiment of Figs. 5–6

Figs. 5–6 show a disc brake 100 operated by an actuating mechanism 101 in accordance with this invention. The disc brake includes a non-rotatable brake frame 102 having a pair of annular lining carriers 103 and 104 embracing the opposing radial annular faces of a brake disc 105 splined for rotation with a wheel 106. The actuating mechanism 101 is mounted in a cylinder 107 in the brake frame.

In mechanism 101, actuating piston 115 fits loosely inside cylinder 107 and has connected to it on its open end a barrel 116 which telescopically embraces an inner central housing 117. Housing 117 in turn is threaded at 118 into an annular anchor cap 119 which screws into the end of cylinder 107 opposite the lining carriers. The actuating piston 115 is normally retracted into cylinder 107 by a retractor spring 120 externally encircling the housing 117 and acting against the opposing annular flanges 121 and 122 of the barrel and housing, respectively.

Actuating piston 115 further includes a center axial tubular wall 125 which projects slidably inside the open end of central housing 117 and is sealed slidably by an O-ring 124. A floating piston 126 in turn fits slidably inside the tubular wall 125. An enclosed chamber 127 between the forward face of the floating piston 126 and the interior of tubular wall 125 contains a trapped volume of fluid serving as a "fluid link" of the mechanism between the floating piston 126 and the actuating piston 115. The fluid link is sealed in chamber 127 by an O-ring 128 encircling the front of the floating piston.

The floating piston 126 is generally of the same construction as that of Figs. 1–3, and includes an end cap 131 housing a pressure-sensing valve 134 sealed by O-ring 135 for reciprocation inside end cap 131. Valve 134 is biased forwardly by a pressure-sensing valve spring 136 to an annular seat 138 surrounding a port 139 through piston 130 communicating with the fluid link in chamber 127. As in the mechanism of Figs. 1–3, the pressure-sensing valve 134 has an annular marginal surface 140 on its front face exposed to actuating fluid in an annular groove 141 around seat 138 and inlet fluid is connected to groove 140 through a passage 143 in the threaded connections between can 131 and piston 130.

The floating piston assembly 126 differs from its counterpart in Figs. 1–3 in that in assembly 126 the end cap 131 includes an external cylindrical portion 146 (see Fig. 6) slidable in a bore 147 formed axially through the bottom of the central housing 117. Bore 147 leads into an annular inlet chamber 148 enclosed by anchor cap 119 to which chamber actuating fluid is communicated through a suitable fitting 150. The cylindrical portion 146 of cap 131 projects into inlet chamber 148 and has attached thereto an annular snap ring 152 to engage the shoulders of the bore 147 in chamber 148 and arrest the forward motion of the floating piston assembly 126. The floating piston 126 may be reciprocated through the bore 147 between the position shown in Fig. 5 when the brake is released to the position shown in Fig. 6 where snap ring 152 engages the shoulders of bore 147. Inside chamber 148 there is a spring 153 biasing the floating piston 126 axially forward against the fluid link in chamber 127.

Actuating fluid in mechanism 101 fills the inlet chamber 148 and is communicated through a port 155 in bore 147 to an interior chamber 156 inside housing 117 around piston 130 of the floating piston assembly 126 and behind the tubular wall portion 125 of the actuating piston 115. Fluid from chamber 156 is in turn conducted to the actuating surface 140 of valve 134 through passage 143.

When the actuating fluid in chamber 148 is pressurized, the fluid in chamber 156 is also pressurized and acts against the end surfaces of tubular wall 125 to urge actuating piston 115 toward lining carrier 103. As piston 115 moves forward compressing spring 120, the floating piston 126 is also moved rightward by the pressure of the fluid and by spring 153. The "release clearance" between the lining carriers is proportional to the distance piston 126 can travel before its snap ring 152 engages the shoulders of bore 147. Accordingly at substantially the same time that piston 115 applies full braking pressure against the lining carriers 103 and 104, ring 152 engages the shoulders of bore 147 to arrest further movement of piston 126.

The pressure-sensing valve 134 is normally closed until the floating piston 126 reaches the limit of its forward travel. After the assembly 126 stops, however, pressure of the fluid acts on surface 140 of valve 134 (through passage 143 and groove 141) and forces open the valve. The valve 134 stands open while the brake is engaged, although there is usually no flow past the valve through port 139 when the valve is initially opened because pressure is balanced in the fluid link and in the actuating fluid.

Like mechanism 11 of Figs. 1–3, valve 134 snaps closed and piston 126 and piston 115 are retracted with the fluid link volume remaining unchanged if the brake is released before significant wear occurs. On the other hand, if there is appreciable lining wear while the brake is engaged, piston 115 is stepped outwardly by fluid in chamber 156 and there is a corresponding flow of fluid thru port 139 to increase the volume of the fluid link. Wherever the brake is eventually released, valve 134 snaps closed to trap the added volume in the fluid link. Then expansion of spring 120 retracts piston 115 against the fluid link which in turn forces the floating piston assembly 126 backward against spring 153 until the end of cap 131 bottoms on anchor cap 119 in chamber 148. The volume of fluid thus added to the fluid link will relocate the starting position of piston 115 relative to housing 117 so that the predetermined release clearance is maintained between the lining carriers and the brake disc 105.

The piston 115 in Figs. 5–6 is not connected positively to carrier 103 and these carriers merely "rattle" loose from the brake disc 105 when the brake is released. Piston 115 could be fastened to carrier 103 if desired, however. The carriers will be appropriately splined to the brake frame as is conventional in this art.

A disc brake is not ordinarily subject to "over-adjustment" from thermal expansion as is a drum brake because the disc 105 can expand radially when heated during braking. However, over-adjustment may occur in a disc brake because of deflection between the brake frame and the disc while the brake is engaged and because of non-radial warpage of disc 105, to cause objectionable dragging of the brake linings on the disc.

If an over-adjusted condition such as this occurs with the mechanism 101, the condition is automatically corrected by merely depressing the brake pedal as in the mechanism of Figs. 1–3. When the fluid in inlet chamber 148 is thus pressurized while the brake 100 is over-adjusted, piston 115 will press the linings against the disc 105 before snap ring 152 arrests movement of the floating piston assembly 126. However, even though the floating piston assembly is only partially through its complete stroke, the actuating fluid acts to force open pressure-sensing valve 134 and then spring 153 will move the assembly 126 through the remainder of its stroke, some of the fluid link spilling backward through port 139 and through passage 143 into chamber 156 as the assembly is advanced. Then when the brake is released, the then existing volume of fluid in the fluid link will be such as to locate piston 115 at the desired release clearance.

Actuating mechanism 101 thus has the same general mode of operation as the mechanism 11 of Figs. 1–3. However, from the construction of mechanism 101, it will be evident that when the actuating fluid in inlet chamber 148 is pressurized, the pressure acts against an effective actuating area equal to the cross-sectional area of only the interior opening of central housing 117 to provide the braking force, instead of acting against the entire cross-sectional area of the actuating piston as is the situation in Figs. 1–3. Accordingly, mechanism 101 requires less fluid displacement to operate the brake than the mechanism of Figs. 1–3. Moreover, mechanism 101 can be made with a shorter overall axial length than the mechanism of Figs. 1–3 so that mechanism 101 is thus better adapted for disc brakes. Mechanisms 11 and 101 are both suitable, however, from a mechanical standpoint for operating either type of brake.

Variations in the constructions disclosed may be made within the scope of the appended claims.

I claim:

1. In a brake mechanism embodying engageable braking members, a cylinder in one of said members, an actuated piston therein adapted to effect braking engagement of the members in response to actuating fluid pressure in said cylinder, a tubular housing secured in said cylinder and having an open end connected in slideable engagement with said actuating piston, a floating piston in said housing, said floating piston and said housing and portions of said actuating piston collectively defining a chamber to contain a fluid link isolated from said actuating liquid and interconnecting said pistons, means for maintaining said pistons biased against said fluid link and said actuating piston biased to a starting position relative to said housing with said braking members disengaged to provide a preselected release clearance of the braking members, means for communicating fluid pressure to said pistons to move them synchronously through their respective actuating strokes to displace said fluid link between them without altering the volume of the fluid link so long as said preselected release clearance remains uniform, said floating piston having a retraction stroke of predetermined length proportional to the release clearance and thereby restricting said actuated piston to a corresponding uniform retraction stroke through the agency of said fluid link, valve means in said floating piston operable to open to communicate said fluid link in said housing and said actuating fluid in response to a predetermined pressure of either said fluid link or of said actuating fluid, and means operable while said valve is open and said actuated piston is in engaged position for displacing said floating piston until it also reaches its extended position, fluid being metered through said valve to vary the volume of the fluid link as the floating piston is thus displaced, whereby the starting position of the actuated piston is adjusted to maintain said release clearance.

2. A brake actuating mechanism comprising a tubular housing, an actuated piston having a skirt portion telescopically surrounding said housing and having a plunger portion slidable inside one end of said housing, said housing and actuated piston being adapted for reception in a cylinder in a brake frame with said housing stationarily secured in the cylinder and said piston reciprocative therein in response to actuating fluid in the cylinder, a retractor spring embracing said housing and engaging said skirt portion for biasing said piston toward a predetermined starting position relative to said housing, a floating piston inside said housing and defining with said plunger portion a chamber to contain a fluid link interconnecting said pistons, means for maintaining said floating piston biased against said fluid link, means to displace said floating piston synchronously with said actuated piston to displace said fluid link without altering the volume of said fluid link, means for limiting the travel of said floating piston so that said piston has a predetermined retraction stroke and thereby restricting the actuated piston to a corresponding uniform retraction stroke through the agency of said fluid link, and valve means in said floating piston adapted to open in response to either a predetermined pressure in said fluid link or in said actuating fluid for the actuated piston to communicate said fluid link and said actuating fluid, and vary the volume thereof to vary the starting position of said actuated position relative to said housing.

3. Mechanism in accordance with claim 2 which further comprises a spring acting on said floating piston and operable when said valve is open and when said actuated piston is in its extended position to displace the floating piston toward its extended position so that fluid is metered through said valve to vary the volume of the fluid link whereby the starting position of the actuated piston is correspondingly adjusted relative to said housing.

4. Mechanism in accordance with claim 2 wherein said housing comprises a pair of tubes in telescopic engagement with each other, the outermost tube being engaged with said retractor spring for said actuated piston, means interconnecting said tubes and adapted to yield to permit axial displacement of the tubes to extend the length of said housing when said retractor spring is compressed to a predetermined load by said actuated piston.

5. Mechanism in accordance with claim 2 wherein said floating piston is slidable telescopically within said plunger portion of the actuated piston and said fluid link chamber is located wholly within said plunger portion, and said housing defining with said floating piston and with portions of said plunger remote from the fluid link a chamber to receive actuating fluid for displacing said actuated piston.

6. Hydraulic actuating mechanism comprising a tubular housing, an actuated piston embracing and slidable telescopically over one end of the housing, a floating piston slidable inside said housing, said floating piston and said actuated piston and said housing cooperating to define a closed chcamber adapted to contain a fluid link between said pistons, means biasing said pistons against the fluid link, means for communicating actuating fluid pressure to at least one of said pistons to effect synchronous displacement of said pistons and displacement of said fluid link relative to said housing without changing the volume thereof, stop means for limiting the axial stroke of said floating piston between predetermined limits, and valve means in said floating piston operable to open either in response to fluid pressure of said fluid link or in response to said actuating fluid pressure to provide for changing the volume of the fluid link in said chamber.

7. Hydraulic actuating mechanism comprising a tubular housing, an actuated piston surrounding one end of said housing and having a plunger portion slidable inside said one end of the housing, means for biasing said piston in a direction to urge said plunger into said end, a floating piston inside said tubular housing, means biasing said floating piston toward said plunger, said floating piston and said plunger cooperating to define an intervening closed chamber adapted to contain a fluid link, said floating piston and said actuated piston being adapted for synchronous reciprocation relative to said housing to displace said fluid link between them without changing the volume thereof, stop means for limiting the axial stroke of said floating piston between predetermined limits, and valve means in said floating piston operable to open either in response to fluid pressure of said fluid link or in response to actuating fluid pressure introduced into said housing to provide for changing the volume of the fluid link in said chamber.

8. In a brake mechanism embodying relatively rotatable engageable braking members, a cylinder in one of said members, a tubular housing rigidly mounted in said cylinder, an actuated piston telescopically engaged with said housing in said cylinder and reciprocative in said cylinder relative to said housing to effect braking engagement of the members in response to actuating fluid pressure in said cylinder, means biasing said actuated piston toward a starting position in said cylinder to provide a preselected release clearance of the braking members, a floating piston inside said housing defining with said actuated piston a chamber to contain a fluid link isolated from the actuating fluid and interconnecting said pistons, means biasing said floating piston toward said chamber, said pistons being movable synchronously through their respective actuating strokes upon pressurization and release of said actuating fluid to displace said fluid link between them without altering the volume of said fluid link so long as said preselected release clearance is uniform, and valve means associated with said floating piston which valve means is normally closed and is operable to open in response to force of fluid pressure either of said fluid link or said actuating fluid to automatically either increase or decrease the volume of fluid in said fluid link sufficient and thereby progressively adjust the starting position of said actuated piston whereby said uniform release clearance of the braking members is maintained.

References Cited in the file of this patent

UNITED STATES PATENTS

| | | |
|---|---|---|
| 2,193,190 | Colman | Mar. 12, 1940 |
| 2,815,830 | Oswalt | Dec. 10, 1957 |
| 2,817,419 | Wolf | Dec. 24, 1957 |

UNITED STATES PATENT OFFICE
CERTIFICATION OF CORRECTION

Patent No. 2,961,074                          November 22, 1960

Burlin W. Oswalt

It is hereby certified that error appears in the above numbered patent requiring correction and that the said Letters Patent should read as corrected below.

Column 4, line 22, for "meter" read -- master --; line 32, for "its" read -- it --; line 39, for "senssing" read -- sensing --; line 41, for "shunt" read -- shut --; column 7, line 10, for "directly" read -- directed --; column 8, line 64, for "Wherever" read -- Whenever --; column 9, line 58, for "actuating" read -- actuated --; column 10, line 71, for "chcamber" read -- chamber --.

Signed and sealed this 20th day of June 1961.

(SEAL)
Attest:

ERNEST W. SWIDER                         DAVID L. LADD
Attesting Officer                           Commissioner of Patents